Sept. 10, 1968 W. I. NUNN, JR 3,400,473
TACHISTOSCOPE
Filed Dec. 27, 1965 2 Sheets-Sheet 1
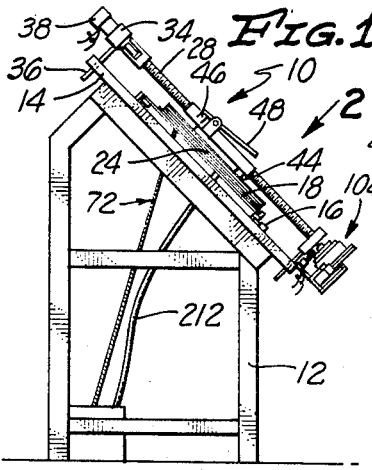
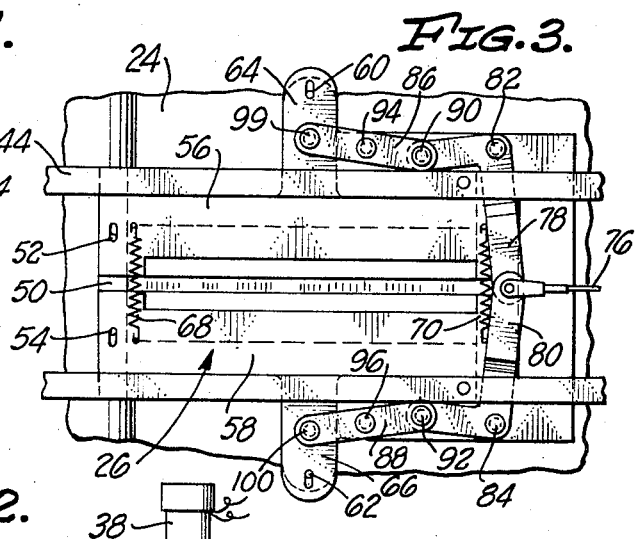
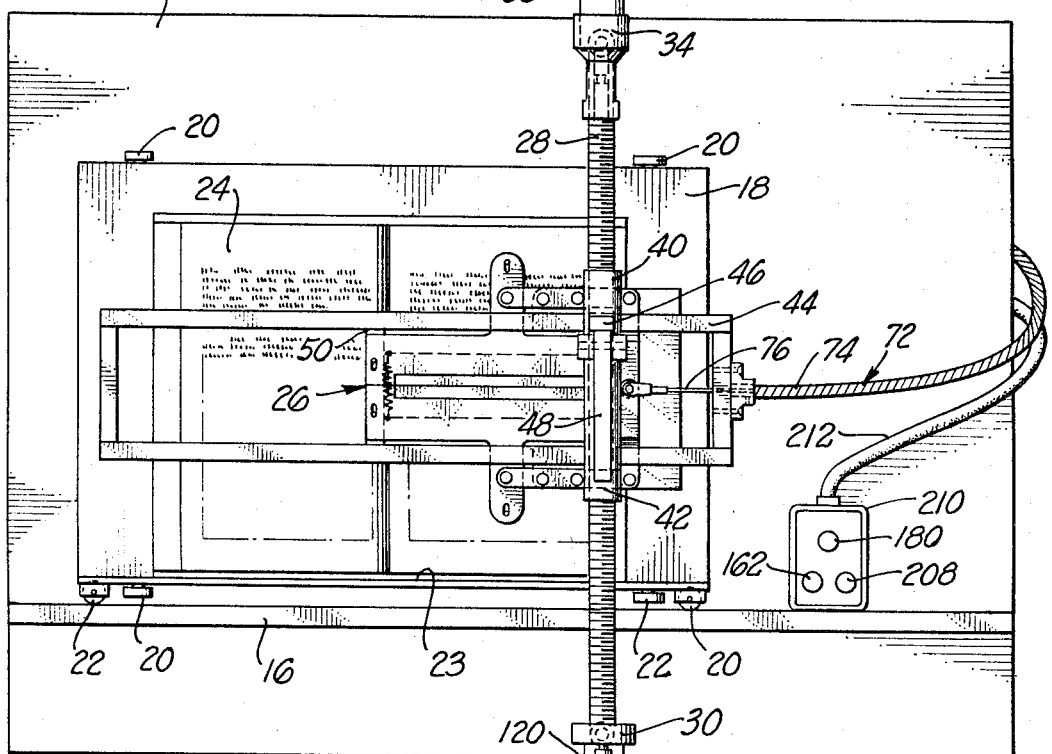
INVENTOR
WESLEY I. NUNN, JR.
BY
EDWARD D. O'BRIAN
ATTORNEY Sept. 10, 1968     W. I. NUNN, JR     3,400,473
TACHISTOSCOPE
Filed Dec. 27, 1965     2 Sheets-Sheet 2
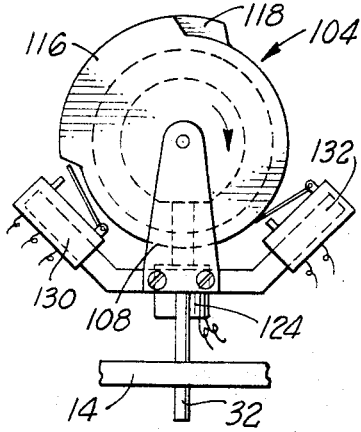
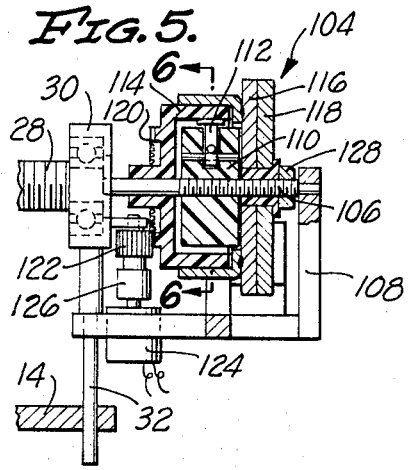
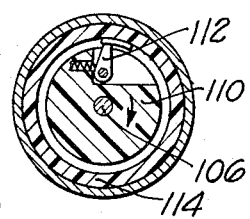
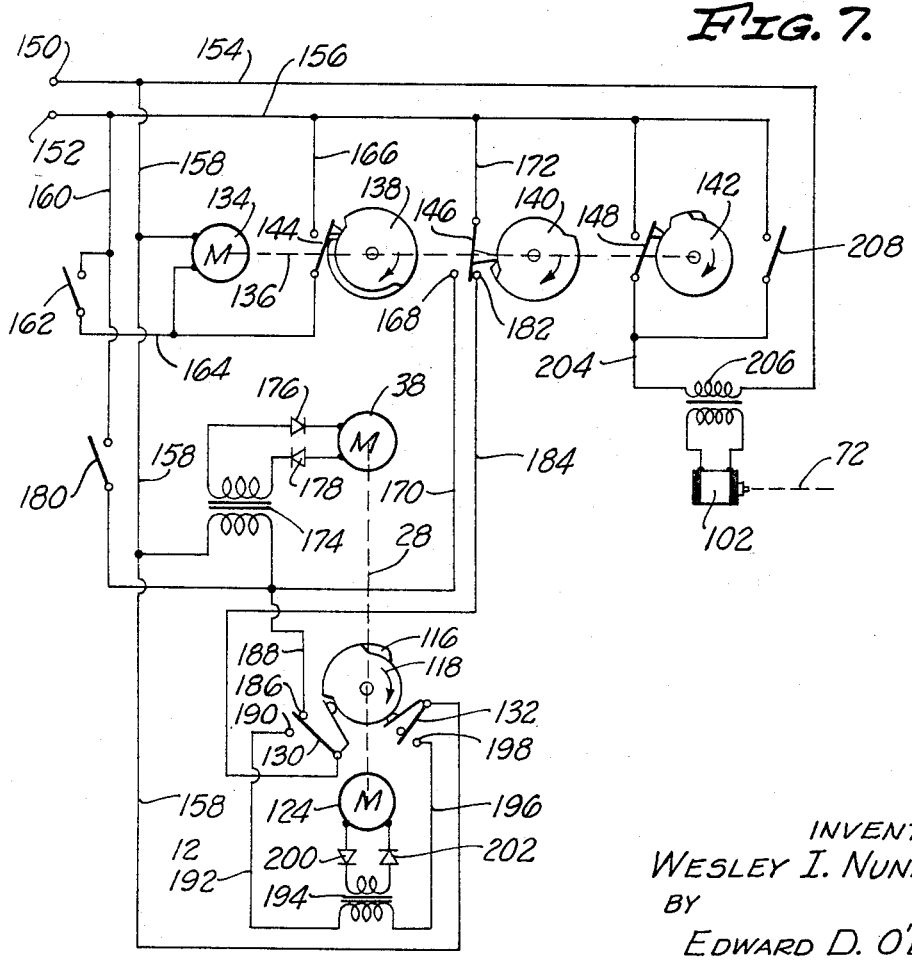
INVENTOR
WESLEY I. NUNN, JR.
BY
EDWARD D. O'BRIAN
ATTORNEY

United States Patent Office 3,400,473
Patented Sept. 10, 1968

3,400,473
TACHISTOSCOPE
Wesley I. Nunn, Jr., 1100 Norby Lane,
Fullerton, Calif. 92633
Filed Dec. 27, 1965, Ser. No. 516,414
11 Claims. (Cl. 35—35)

ABSTRACT OF THE DISCLOSURE

A tachistoscope is disclosed which has a support means adapted to support printed material, a shutter means located on the support means so as to be positioned above any such printed material held by the support means and positioning means for moving the shutter means in increments along any such printed material corresponding to the spacing between lines of print on any such printed material. The shutter means has blade means which are capable of being opened and closed so as to expose an entire line of print on any such printed material.

This invention is directed to a tachistoscope and particularly to a tachistoscope which is especially adapted to individual and small group use to improve comprehension of matter to be read, improve the speed of comprehension and to present reading matter from any printed sheet to accomplish these purposes.

Tachistoscopes are well known as a means for visually presenting a small amount of printed material for a limited time for viewing. Present tachistoscopes are not in wide use to devolop speed of reading and increased comprehension because of their built-in faults. Present tachistoscopes are merely projectors which project the image of printed words upon a screen for a short period of time. Of course, slides must be prepared for such a machine, with each slide corresponding to one group of words to be displayed at a time. Therefore, many slides would have to be prepared simply to cover the amount of material shown in one page of a book. Thus, few slides are prepared, and they are soon memorized. Once memorized, they lose their effectiveness in increasing the speed and scope of comprehension. Since tachistoscope practice cannot be obtained without the preparation of a large number of slides, and such are not normally prepared, practice is not obtained.

Accordingly, it is an object of this invention to provide a tachistoscope which is able to easily and conveniently present for a short period of time a group of printed words to an observer from any printed sheet of paper so that words may be displayed from any such source.

It is a further object of this invention to provide a tachistoscope which is sufficiently flexible to permit displaying of words to an observer for a limited period of time from material, such as books and the like, and to permit the display time to be appropriately adjusted in accordance with the developing speed of comprehension of the observer and the character of the material.

It is a further object of this invention to provide a tachistoscope that proceeds from line to line on a printed page and displays each line for a predetermined, adjustable viewing time.

It is a further object of this invention to provide tachistoscope structure which is capable of covering a printed line, opening the printed line for a limited, adjustable amount of time and proceeding to the next line, the equipment being adjustable for line spacing.

It is a further object of this invention to provide tachistoscope equipment which rests upon the material being displayed so that various kinds and thicknesses of printed materal may be placed thereunder and displayed.

It is another object of this invention to provide manual control means for advancement of the tachistoscope equipment from line to line and for providing manual ability for re-exposing a line for further inspection.

Other objects and advantages of this invention will become apparent from a study of the following portion of this specification, the claims and the attached drawings in which:

FIG. 1 is an end elevation of the tachistoscope of this invention;

FIG. 2 is an enlarged plan view taken in the direction of arrow 2 in FIG. 1;

FIG. 3 is a further enlarged plan view of the shutter equipment of the tachistoscope of this invention;

FIG. 4 is an enlarged and elevational view of the lead screw of the tachistoscope;

FIG. 5 is a longitudinal section taken through the end of the lead screw;

FIG. 6 is a section taken along the line 6—6 of FIG. 5; and

FIG. 7 is a schematic electro-mechanical drawing of the control system of the tachistoscope.

As an aid to understanding this invention it can be stated that it is directed to a tachistoscope. The tachistoscope is mounted on a frame which comprises a table top which serves as support for the remainder of the equipment and serves as a surface for placement of the material to be observed. A suitable frame preferably maintains the observed material in position. A shutter is positioned over the material to be observed, which shutter is relatively long so as to encompass a line of printed materials. The shutter is mechanically operated to open for a limited period of time. The shutter is mounted for movement from line to line. Such mounting and movement is provided by a lead screw which is motor driven to move the shutter structure. Suitable controls of adjustable nature are provided to open the shutter and to move the shutter structure from line to line.

This invention will be understood in greater detail by reference to the following detailed description of the drawings. Referring now to Fig. 1, the tachistoscope of this invention is generally indicated at 10. In the embodiment shown the tachistoscope 10 has a base of 12 which supports a printed material support surface 14. As illustrated, the tachistoscope 10 is floor mounted but it is equally clear that suitable supports may be provided under the surface 14 for mounting it at a suitable angle and a suitable height upon a desk or table, or other convenient location. The surface 14 is preferably rectangular, and carries a guide rail 16 thereon. The rail 16 supports frame 18, but the frame 18 is also supported directly upon the surface 14. Frame 18 is movable along the surface 14 by means of wheels 20 and is movable along rail 16 by means of wheels 22. Frame 18 has a rectangular opening 23 which is of convenient size to accept an open book 24. Book 24 lies within the opening and frame 18 simply holds the book in position. The frame 18 is movable on wheels 20 and 22 from side to side on surface 14 so that either the left or right page of book 24 may be placed under the shutter of this tachistoscope.

Shutter 26 is mounted upon lead screw 28 in such a manner that the lead screw may move the shutter 26 down the page to successively expose successive lines in the book 24. Lead screw 28 is carried upon bearing 30, see FIG. 5, at its lower end. Bearing 30 is mounted upon post 32 which extends through an opening in surface 14. Similarly, the upper end of lead screw 28 is rotatably mounted in housing 34 which in turn is mounted upon post 36, see FIG. 1, which also extends through an opening in surface 14. Thus, the lead screw and equipment carried thereon floats with respect to the surface. Housing 34 also carries lead screw drive motor 38 which is mechanically coupled through built-in reduction gearing to lead screw 28 to rotate lead screw 28.

As is previously indicated, shutter 26 is mounted on lead screw 28. Bearings 40 and 42 embrace the exterior of lead screw 28 and do not engage in the threads thereof. Bearings 40 and 42 carry rectangular framework 44 which extends substantially across frame 18. Half nut 46 is pivoted on the framework 44. The half nut 46 is spring urged into engagement with the threads of lead screw 28, and manual operation of handle 48 disengages the half nut therefrom. Thus, with half nut 46 engaged with lead screw 28 rotation of the lead screw 28 causes movement of framework 44 in a direction parallel to the axis of lead screw 28. Mounted upon frame 44 are the moving portions of shutter 26. Guide 50 carries guide pins 52 and 54 which are accepted in guide slots in the two shutter blades 56 and 58. Similarly, pins 60 and 62 are accepted in similar guide slots in extensions 64 and 66 respectively formed on shutter blades 56 and 58. Springs 68 and 70 have their ends secured to the shutter blades 56 and 58 to urge them to a closed, adjoining position. Springs 68 and 70 are tension springs.

Operating cable 72, see FIG. 2, has a flexible tubular sleeve 74 which is secured at its outer end to frame 44 and a flexible operating wire 76 therein which is secured at its outer end to bell cranks 78 and 80. Bell cranks 78 and 80 are respectively pivoted to the frame 44 at pivots 82 and 84 and are pivoted to links 86 and 88 respectively at pivots 90 and 92. Links 86 and 88 are pivoted adjacent their center point to the frame 44 respectively at pivots 94 and 96 and are respectively pivoted to extensions 64 and 66 at pivots 99 and 100. By this structure it is seen that when operating wire 76 is pulled within sleeve 74, shutter blades 56 and 58 move apart to expose the material therebelow. This motion causes sliding of the blades over pins 52, 54, 60 and 62, which pins provide limited motion in the opening direction. This motion also extends springs 68 and 70, which springs cause closing when tension on operating wire 76 is released. Operating cable 72 is connected to be actuated by solenoid 102, see FIG. 7.

In order to provide the correct amount of rotation of lead screw 28 to move the shutter 26 downward by one line space, additional spacing control mechanism is necessary. This additional control mechanism is best illustrated in FIGS. 4, 5 and 6, and is shown in top elevation of FIG. 2. This spacing control mechanism is generally indicated by the numeral 104 in Figs. 2, 4 and 5. The spacing control mechanism 104 has an extension shaft 106 secured to the lower end of lead screw 28. The end of the shaft 106 is journalled in a bearing in the end of bracket 108 which is secured to post 32. Clutch disc 110 is secured to shaft 106 to rotate therewith. As is particularly well illustrated in FIG. 6, drive shoe 112 is pivotally mounted on clutch disc 110 and is spring urged in the counter-clockwise direction looking axially upward along lead screw 28. Drive shoe 112 is in frictional engagement with the interior of clutch drum 114. Thus, when lead screw 28 rotates in the clockwise direction as is seen in FIG. 6, which is the normal direction for advancement of shutter 26 downward along book 24, shoe 112 frictionally engages the interior surface of clutch drum 114 and rotates it in the clockwise direction. Adjustably mounted upon clutch drum 114, to be driven therewith, are overlapping cams 116 and 118. Thus, these cams rotate in the clockwise direction when the lead screw 28 rotates in the clockwise direction.

Other than drive shoe 112, clutch drum 114 is rotatably mounted with respect to shaft 106. Clutch drum 114 carries gear 120 on its rear face. Gear 122 is in engagement with gear 120 and is driven by motor 124 through unidirectional clutch 126. Clutch 126 operates in such a manner that when shaft 106 is driving clutch drum 114 in the clockwise direction through shoe 112, motor 124 is not driven. However, motor 124 is able to drive through clutch 126 to rotate clutch drum 114 in the clockwise direction when shaft 106 is stationary and motor 124 is energized. Thus, motor 124 is a means for resetting cams 116 and 118 with respect to lead screw 28, and thus is called a reset motor.

Cams 116 and 118 are individually rotatable with respect to clutch drum 114, and each of the cams has a portion of lesser radius and a portion of greater radius. These cams lie adjacent each other and are rotatable with respect to each other so that the portion of greater radius may have a greater or lesser total angle. The cams are locked with respect to shaft 106, after adjustment is made, by means of nut 128. Bracket 108 carries switches 130 and 132 which are electrically connected in the control system as is hereinafter described.

Referring now to FIG. 7, the schematic electromechanical assembly comprises timer motor 134 which has a built-in gear reduction and drive timer shaft 136. Mounted upon timer shaft 136, to rotate therewith, are cams 138, 140 and 142. Each of these cams is a double cam structure wherein each of the cam elements has a partial circumference of larger radius and a partial circumference of small radius. The sections can be turned relatively to each other so as to adjustably define the amount of larger radius and smaller radius exposed for actuating an adjacent switch. Cam 142, as shown in FIG. 7, has relatively smaller arcs of greater radius so that only a short time actuation occurs. Switch 144 is associated with cam 138, switch 146 is associated with cam 140 and switch 148 is associated with cam 142.

Electric power of suitable voltage and frequency is supplied to terminals 150 and 152 to energize power lines 154 and 156. Line 154 is connected by line 158 to one side of motor 134. Line 160 is connected to start switch 162 which is in turn connected by line 164 to the other side of timer motor 134. Thus, when normally open start switch 162 is manually closed, the motor 134 runs to rotate the cams 138, 140 and 142. Line 166 is connected through switch 144 to line 164. As is shown in FIG. 7, after cam 138 rotates a small amount, switch 144 is closed. Thus, start switch 162 can be released and electric power is supplied to timer motor 134 through line 166, switch 144 and line 164. Thus, timer motor 134 runs until shaft 136 rotates almost an entire revolution.

Immediately after the beginning of the revolution, switch 146 moves to contact 168 to energize line 170 from line 172, which is in turn connected to line 156. Line 170 is connected to one side of the primary of transformer 174, while the other side of the primary of transformer 174 is connected through line 158 to line 154. Thus, transformer 174 is energized. The secondary transformer 174 is connected through rectifying diodes 176 and 178 to lead screw motor 38. Thus, lead screw motor 38 is energized and rotates lead screw 28.

It can be noted at this juncture that manually operable switch 180 is connected between lines 160 and 170 so that a manual closing thereof from its normally open position energizes motor 38 without having the timer motor 134 running. Manual switch 180 provides for positioning the shutter with respect to the first line of type on the page of the book 24 so as to establish initial alignment. It can also be used to correct alignment of the shutter with respect to a particular line, part way down the page.

As noted, the movement of switch blade 146 to contact 168 causes rotation of lead screw motor 38 and lead screw 28 driven thereby. Depending upon the lead of the lead screw, and the spacing of the lines on the printed sheet covered by the shutter 26, the lead screw 28 may rotate less than one turn, may rotate more than one turn or may rotate more than two turns. Such rotation is time controlled by the time duration of contact of switch plate 146 with contact 168, which is in turn governed by the adjustment of cam 140. However, it is clear that such construction is not sufficiently accurate to successively, accurately, sequentially align with a large number of lines on a printed page. Thus, when cam 140 moves switch blade 146 from contact 168, it makes contact with contact 182. Contact 182 is connected by line 184 to the blade of switch 130. Cams 116 and 118 are arranged so that when this occurs, the blade is in contact with contact 186. Contact 186 is in turn connected by line 188 to line 170 to continue energization and operation of the screw motor 38. As is seen in FIG. 7, cams 116 and 118 continue to rotate in the clockwise direction due to energization of the screw motor 38 through line 188 until switch 130 deenergizes contact 186 to thus stop rotation of lead screw 28. Thus, rotation of the lead screw is dependent upon lead screw position rather than time of operation. By this means, accurate line spacing can be accomplished.

In order to accomplish proper line spacing for the subsequent line, the cams 116 and 118 must be reset to the start position with respect to lead screw 28. Such is mechanically accomplished by motor 124 by the mechanical construction previously described. This reset is electrically accomplished by switches 130 and 132. When switch 130 moves away from contact 186 to stop lead screw motor 38, it energizes line 192. Line 192 is connected to the primary of transformer 194 while the other side of the primary is connected to line 196. Line 196 is connected to the normally open contact 198 of switch 132 which in turn is connected to line 158. At the time lead screw motor 38 is deenergized, switch 130 provides energization to contact 190 and switch 132 is closed so that continuity results through the primary of transformer 194. The secondary of the transformer is connected through diodes 200 and 202 which are connected to motor 124. Thus, motor 124 is energized and reset cams 116 and 118 move to the start position. This start position is determined by the opening of switch 132. Thus, while subsequent operations are proceeding, the cams 116 and 118 are reset to a position from which they can determine the termination of rotation of lead screw 28 to establish the position of shutter 26 for the next subsequent line.

During this time, timer motor 134 remains energized, and the cams on shaft 136 continue to rotate. Toward the end of the rotation of shaft 136, cam 142 closes switch 148 for a predetermined short period of time. Switch 148 is connected by line 204 to the primary of transformer 206. The other side of the primary is connected to line 154. The secondary of transformer 206 is connected to solenoid 102 so that during the time switch 148 is closed, solenoid 102 is energized and operating cable 72 is actuated to maintain the shutter blades 56 and 58 in the open position. Thus, the adjustment of cam 142 determines the time the blades are open. Manually operable switch 208 is connected between line 156 and line 204 so that manual closing thereof causes opening of the shutter blades.

As is seen in FIG. 2, the switches 162, 180 and 208 are conveniently mounted together in a portable switch box 210 which is connected to the remainder of the electrical circuit by means of flexible cable 212. The switches can be kept in a convenient position.

In operation, a book 24 is opened and placed within opening 23 of frame 18. The frame 18 is positioned beneath the shutter 26 in such a manner that the lines of either the left or right page may be observed through the shutter blade 26. The entire frame 44 and the structure supported on it is floating so that the shutters rest directly on the book page. Such provides sharp viewing and sharp cutoff. To initiate the operation, the manually operable shutter opening switch 208 is depressed and the manually operable adjusting switch 180 is depressed. This causes rotation of lead screw 28 until the shutter opening is directly over the first lines to be inspected. Of course, should the shutter carrying frame 44 be too low on the page to start with, handle 48 is depressed to disconnect half nut 46 and the structure is manually moved upward. Thereupon, the lead screw can be operated by means of manual switch 180 until the shutters are properly positioned.

After the shutters are positioned and the manual switches released, start switch 162 is depressed for a short period of time. This energizes timer motor 134 which causes operation of cams 138, 140 and 142. These cams, and the circuitry previously described, move the shutter down to the next line of type and stop it there. While stopped, cams 116 and 118 are reset. During this stop time, cam 142 opens the shutter for the predetermined length of time so that the observer has a chance to see a short time display of the line. This short time display causes the observer to practice quick comprehension of the entire line. Cam 142 can be adjusted for different time periods depending upon the capabilities of the user.

As practice improves speed of comprehension of printed lines, this cam is adjusted to leave the shutter open for shorter periods of time. Should the user desire an inspection of the line to check his comprehension, he manually closes switch 208 which opens the shutter for the time the switch is closed. Should a new piece of printed material, such as book 24, be placed in frame 18, the line spacing may be somewhat different than the line spacing of the previous printed material. Adjustment of cams 116 and 118 permits adjustment of the stopping point so that an accurate stopping point is readily determined for each new piece of printed material.

This invention having been described in its preferred embodiment, it is clear that it is susceptible to numerous modifications and embodiments within the scope of this invention and without the exercise of the inventive faculty. Accordingly, the scope of this invention is defined by the scope of the following claims.

I claim:
1. A tachistoscope, said tachistoscope comprising:
a support means for supporting printed material;
a shutter means located upon said support means so as to be positioned above any printed material located on said support means;
said shutter means having blade means capable of opening and closing when opposite a line of print on printed material located on said support means so that an entire line of such print is visible at one time; and
positioning means for moving said shutter means in increments substantially equal to increments between lines of print on printed material supported on said support means;
said positioning means being connected to said support means and said shutter means.
2. A tachistoscope as claimed in claim 1 including:
means for actuating said positioning means so that said shutter means is moved in increments substantially equal to the increments between the lines of print on printed material supported on said support means, each time said shutter means is operated so as to be opened.
3. A tachistoscope, said tachistoscope comprising:
support means adapted to support printed material;
shutter means, said shutter means being adapted to lie close to printed material supported on said support means and being openable to display printed material for a limited period of time,
said shutter means comprising first and second shutter blades and shutter operating means connected to said first and second blades,
said first and second blades being movable with respect to each other upon actuation of said shutter operating means, said shutter blades being movable from an unactuated closed position wherein said shutter means is adapted to cover printed material supported on said support means to an open position wherein printed material is adapted to be displayed; and
positioning means connected to said support means and to said shutter means, said positioning means being connected to move said shutter means with respect to said support means in increments substantially equal to increments between lines of the printed material.

4. The tachistoscope of claim 1 wherein said shutter means is mounted on a frame, each of said first and second shutter blades being movably mounted with respect to said frame.

5. The tachistoscope of claim 4 wherein said shutter operating means comprises a flexible cable, first and second bell cranks connected to said flexible cable and pivoted on said frame, said first and second shutter blades being respectively connected to said first and second bell cranks so that actuation of said cable causes opening motion of said first and second shutter blades with respect to said frame so as to adapt said shutter blades to display printed material therebetween when actuated.

6. The tachistoscope of claim 1 wherein said means for incrementally moving said shutter means with respect to said printed material support means comprises a lead screw and motive means connected to rotate said lead screw, said lead screw being connected to said printed material support means and to said shutter means.

7. The tachistoscope of claim 5 wherein said lead screw carries a cam thereon, said cam being connected to said lead screw motive means so as to stop said lead screw motive means and stop said lead screw when said lead screw reaches a particular rotative position.

8. The tachistoscope of claim 6 wherein said cam mounted on said lead screw is driven by said lead screw by means of a one way clutch, a reset motor being connected to drive said cam in the same direction that said lead screw drives said cam without driving said lead screw by slippage in said one way clutch.

9. The tachistoscope of claim 1 wherein said shutter means is movably mounted with respect to said printed material support means so that said shutter means is adapted to lie directly upon printed material supported by said printed material support means whereby said shutter means lies closely adjacent the printing thereon.

10. The tachistoscope of claim 1 wherein a control means is provided to control the positioning of said shutter means with respect to said printed material support means and to control the opening of said shutter means, said control means comprising a cam shaft, a motor connected to drive said cam shaft, a first cam rotatable with said cam shaft and controlling said motor so that said cam shaft operates substantially a complete revolution;

a second cam on said cam shaft, motive means on said positioning means, said motive means being controlled by said second cam; and a third cam on said cam shaft, said third cam being connected to actuate said shutter means so that upon actuation thereof, said shutter means is opened.

11. The tachistoscope of claim 9 wherein said control means further comprises a cam driven by said motive means, said cam being connected to energize said motive means when said second cam would otherwise deenergize said motive means, said cam being related to the position of said motive means and thereby related to the position of said shutter means with respect to said support means, said cam means deenergizing said motive means when said motive means moves said shutter means to a predetermined position;

a reset motor connected to said cam, said reset motor being adapted to reset said cam with respect to said motive means after said motive means is deenergized by said cam, said reset motor returning said cam to a predetermined, initial position.

References Cited

UNITED STATES PATENTS 2,758,393    8/1956    Levy _____ 35—35.2

EUGENE R. CAPOZIO, *Primary Examiner.*

W. H. GRIEB, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,400,473                                  September 10, 1968

Wesley I. Nunn, Jr.

It is certified that error appears in the above identified patent and that said Letters Patent are hereby corrected as shown below:

Column 7, lines 6, 19, and 36, and column 8, line 3, claim reference numeral "1", each occurrence, should read -- 3 --. Column 7, line 25, claim reference numeral "5" should read -- 6 --; line 30, claim reference numeral "6" should read -- 7 --. Column 8, line 17, claim reference numeral "9" should read -- 10 --.

Signed and sealed this 3rd day of March 1970.

(SEAL)
Attest:

Edward M. Fletcher, Jr.                        WILLIAM E. SCHUYLER, JR.
Attesting Officer                                     Commissioner of Patents